Aug. 7, 1945.  G. D. SIMONDS  2,381,624
TANDEM DRIVE AXLE
Filed Oct. 5, 1942  2 Sheets-Sheet 1

INVENTOR
GEORGE D. SIMONDS
BY
Wheeler, Wheeler & Wheeler
ATTORNEYS.

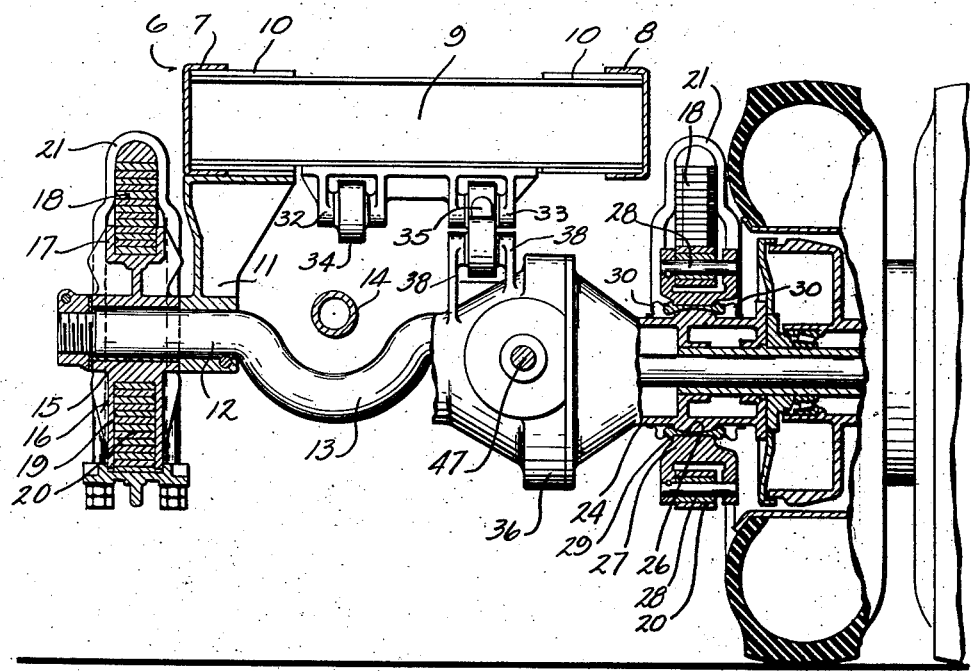

Patented Aug. 7, 1945

2,381,624

UNITED STATES PATENT OFFICE 2,381,624

TANDEM DRIVE AXLE

George D. Simonds, Clintonville, Wis., assignor to The Four Wheel Drive Auto Company, Clintonville, Wis., a corporation of Wisconsin Application October 5, 1942, Serial No. 460,791

18 Claims. (Cl. 180—22)

This invention relates to improvements in a tandem drive axle organization and has particular reference to the spring mounting of a vehicle frame from tandem axles and to the provision of novel and improved driving and torque connections to the respective axles. The present application is a companion to the application of Donley and Simonds entitled "Drive for multiple axle vehicles," filed July 17, 1942, Serial No. 451,360.

It is the primary object of the present invention to provide a novel and improved tandem axle organization in which full freedom of movement is afforded to the individual wheels or wheel pairs without cramping either at the spring seats or the torque rod connections or the driving connections.

Another object of the invention is to provide a novel arrangement employing springs in pairs at each side of the vehicle in a manner to absorb and distribute torque and transmit driving thrust while permitting the individual axles considerable freedom of independent movement at each end.

Other objects of the invention will be more apparent after the construction has been disclosed.

In the drawings:

Fig. 3 is a view taken in section on the line 3—3 of Fig. 1.

Fig. 4 is a fragmentary detail in transverse section on an enlarged scale through a torque rod connection.

Fig. 5 is a view in side elevation of the parts shown in Fig. 4.

Like parts are identified by the same reference characters throughout the several views.

Figure 1:
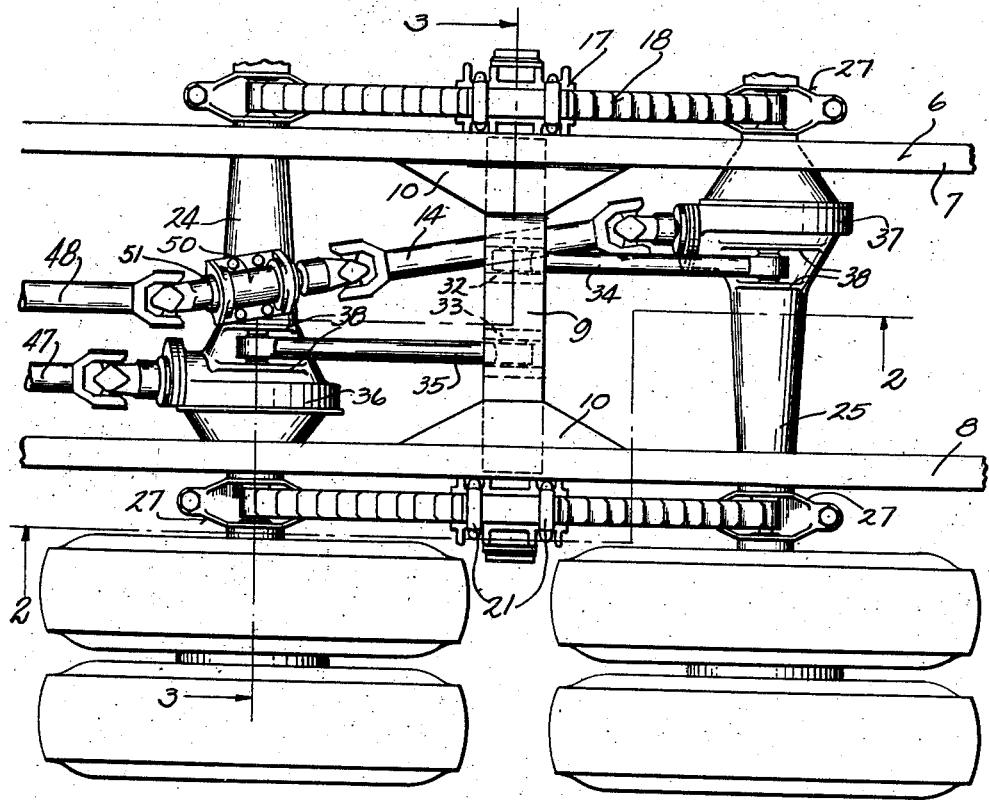
Fig. 1 is a fragmentary plan view of an organization embodying the invention.

The vehicle frame 6 comprises longitudinal frame members 7 and 8 connected by a cross member 9 and braced by suitable gusset plates 10. Immediately beneath the cross member 9 are brackets 11 braced by a cross rod 12 which is formed downwardly at 13 to pass one of the driving shafts 14.

Only one of the brackets 11 is illustrated in Fig. 3 (the other being identical with it). Projecting laterally from each of the brackets 11 is a skein portion of the cross shaft 12 upon which there is a bushing at 15 pivotally supporting a spring seat member 16. This member has a channel 17 for an upper spring 18 and a deeper channel at 19 for a lower spring 20. The two springs are connected together by yokes 21 which clamp them firmly in the respective spring seat channels 17 and 19. Obviously, the vehicle load, as transmitted through the projecting ends of shaft 12, is imposed through the bushing 15 and spring seat member 16 directly on the top leaf of the lower spring 20 but is transmitted under tension through the yoke members 21 to the drop leaf of the upper spring 18, on each side of the vehicle.

The main leaf (the lower leaf) of each spring is provided at each end with an eye for connection with the axle. It is a feature of the present invention, however, that the connection is not made directly with the axle but with a bracket in which its axle is journaled. The arrangement is the same at each end of each of the two load bearing axles shown at 24 and 25, respectively. The universal bracket connection is shown in section in Figure 3 at one end of the axle 24, the other being of like construction. The axle has an annular bearing surface 26 of spherical contour. The spring anchorage bracket 27 has upper and lower ears provided with cross pins 28 for the eyes of the upper and lower springs. The spacing between the ears is greater than the width of the spring eye for reasons hereinafter to be explained. The dimensions of the parts are such that the respective spring eyes engage, in each instance, the inner ear.

Figure 2:
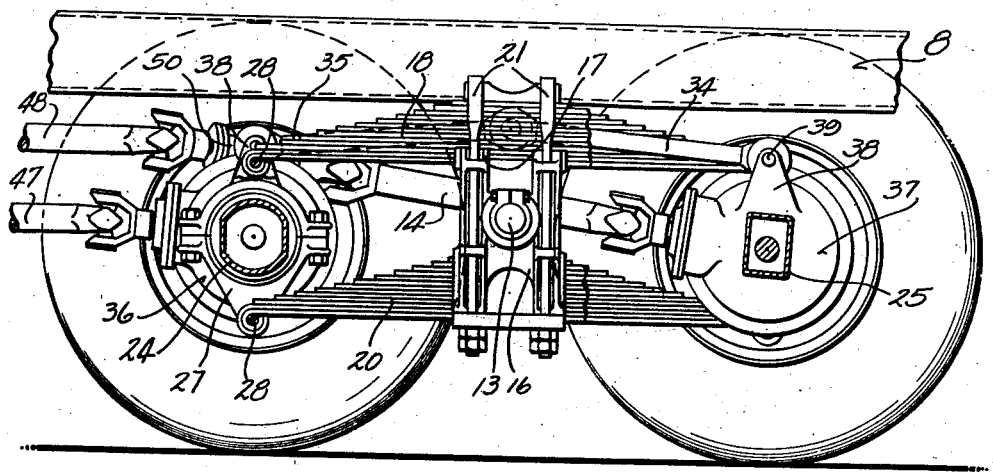
Fig. 2 is a view taken in section on the line 2—2 of Fig. 1.

The bracket 27 is, as shown in Figure 2, made in two parts bolted together about the spherical bearing surface 26 and an intervening replaceable bushing 29 which has a concave inner bearing surface complementary to that shown at 26 upon the axle. A boot or boots 30 are preferably provided to exclude dirt from the bearing between bushing 29 and bearing surface 26. The arrangement is such that the axle, if not otherwise restrained, would turn freely in bushing 29. The axle also has universal movement within bracket 27, the bracket being restrained against such movement by reason of its connection at top and bottom with the springs 18 and 20, respectively.

The load bearing axles 24 and 25 carry wheels at their respective ends singly or in pairs in any conventional manner. The particular wheel mounting and the particular axle driving connections to the wheels and the particular braking connections form no part of the present invention.

Since the load bearing axles 24 and 25 are not restrained against rotation in the spring anchorage brackets 27, it is necessary to provide some other means for taking the torque and maintaining the axles properly positioned with respect to the drive shafts. For this purpose, I provide on the under surface of the cross member 9 of the frame, a pair of brackets 32 and 33 (Fig. 3) to which the torque rods 34 and 35 are pivoted. The load bearing axles 24 and 25 have their respective differential housing portions 36 and 37 at opposite sides of the vehicle, the differential housing portion 36 of the forward load bearing axle 24 being at the left while the differential housing portion 37 of the rear axle 25 is at the right of the chassis. Each of the differential housing portions carries on its inner side a pair of ears at 38 (Figs. 1, 3 and 4). These ears are connected by a cross pin 39 which supports a spherical bearing member 40. Figure 4 is typical of the arrangement. The torque rod 35 is tubular and its end receives a shank 41 of a bearing head 42 which is of annular form to embrace the spherical bearing member 40 on one side. It provides a hemispherical bearing surface at 43 complementary to the surface of member 40, the bearing surface 43 being preferably annularly recessed to receive packing at 44. Bolted to the head 43 is a removable annulus 45 likewise provided with a hemispherical bearing surface complementary to that of the bearing member 40 and likewise preferably packed at 46. This arrangement permits the restrained load bearing axle to tilt in a transverse plane with respect to the vehicle frame without cramping or twisting the connection of the torque rod 35 between the axle and the frame.

The torque rod has its pivotal connection with the vehicle frame approximately in the transverse center line through the two upper springs 18. At their free ends, the respective torque rods 34 and 35 have their connections to the load bearing axles approximately on the transverse center line upon which the upper springs 18 are connected at their respective ends with such axles. Therefore, as the axles move bodily with respect to the frame, they are constrained both by the torque rods and the upper springs to move upon arcuate paths about the transverse center line defined by the brackets 32 and 33 and the centers of the upper springs 18. In the course of such movement, the spring bearing bracket 27 connected with the respective axles are maintained substantially vertically upright because any flexing of the upper springs must necessarily be duplicated by flexing of the lower springs. Much the same action occurs when both springs swing unitarily around the centers represented by the ends of the stationary shaft 12 upon which the spring seat members are pivoted. There is a parallelogram established by the respective springs and the respective anchorage brackets in which the axles are swiveled.

The drive shaft 47 connects to the differential mechanism in the differential casing 36 while drive shaft 48 is connected to the differential mechanism in casing 37 through the oblique shaft sections 51 and 14, shaft section 51 being mounted in a pillow block 50 carried by the load bearing axle 24. This arrangement not only provides a convenient means for communicating motion to the live axles through suitable differential mechanisms in the housings 36 and 37 but, in addition, the particular organization is calculated to avoid power loss and distortion. It will be noted that both of the drive shafts 47 and 48 drive to shaft sections which are supported in their bearings on the forward load bearing axle housing 24. Thus the drive shafts 47 and 48 tend to have closely similar movement as the wheels of the load bearing axle housing 24 traverse the road. It will further be noted that the torque rods 34 and 35 are closely adjacent the center line of the vehicle but at opposite sides of such center line. This desirable arrangement is obtained while still providing the anchorage for torque rod 35 between shafts 47 and 48 as shown in Figure 1.

In operation, the organization combines exceptional freedom of movement between the various points of support with a very high degree of strength and positive transmission of propulsion.

Assuming that the vehicle encounters either an upward or downward bump which affects simultaneously the wheels at both ends of the forward load bearing axle 24, such axle will move upwardly or downwardly as a unit with respect to axle 25. If the bump is not severe, the springs 18 and 20 at the two sides of the vehicle may not flex materially, the shock to the vehicle being minimized by the fact that the shaft 13 upon which the spring assemblies oscillate is midway between the two axles and, therefore, this shaft and the vehicle frame will be subjected to a movement which, in its extent or range, will be only half the movement occasioned vertically in the axle 24 by passage over the bump. As the upper and lower springs 18 and 20 of the pairs at opposite sides of the vehicle oscillate upon the shaft 13 in traversing the bump, they will retain substantial parallelism, their ends being fixed to the oscillatory spring anchorages 27. These anchorages will turn slightly with respect to the axles to maintain the parallelogram arrangement above described, but the axles themselves will be held by the torque rods 35 and 34 rigidly in their predetermined relation to the truck frame so that the entrant angles of shafts 47 and 14 will not be materially affected.

Assuming that the bump effects only one side of one axle, the axle will then tilt in a transverse plane. This will cause movement of the spring pair at one side of the vehicle and not at the other. This tilting movement of the axle is freely accommodated by the universal connection of the torque rods 34 and 35 to the respective axles and by the universal connection of the spring anchorages 27 to the spherical bearing surfaces 26 of the respective axles. It will, of course, be apparent that the springs are held by their yokes 21 and spring seat members 16 at uniform lateral distances from each other. When one of the axles tilts in a transverse plane in the manner just described, even though the spring anchorage members 27 at its ends are permitted by their universal mounting on the axle to retain their upright positions, they will nevertheless be obliged, by the tilting of the axle, to approach each other in horizontal projection. This lateral displacement of the spring anchorage members 27 with respect to the ends of the springs is accommodated by the clearance between the spring eyes and the ears of the anchorage member 27, to which reference has already been made and which is clearly shown in Figure 3. Normal engagement of the spring eyes with the inner ears assures against any lateral movement of the body respecting the axles.

I claim:

1. In a vehicle, the combination with a frame and springs connected therewith and having longitudinally projecting end portions provided with eyes at opposite sides of the vehicle, of a transversely extending load bearing axle having supporting wheels at opposite sides of the vehicle, spring anchorage brackets universally mounted on the axle adjacent the respective wheels, pins carried by the brackets and extending through the eyes of the respective springs, said spring eyes being substantially fixed against relative lateral displacement, and each such bracket comprising means laterally engaging its respective spring eye at its inner end in the normal horizontal position of the axle and free to move therefrom when said axle tilts.

2. In a vehicle, the combination with a frame, of a pair of spring seat members disposed under opposite sides of the frame, means pivotally connecting the respective members with the frame for the support thereof, an upper spring connected with each of said members, a lower spring connected with each of said members, front and rear load bearing axles disposed between the ends of the upper and lower springs, means pivotally connecting the spring ends with the respective axles, and a torque arm connecting each of said axles with said frame, each of the respective torque arms being disposed substantially at the level of one of said springs and being pivotally connected with the axle and the frame at substantially the level at which the last mentioned spring has its pivotal connection with the axle and its connection with the seat member aforesaid.

3. In a vehicle, the combination with a frame, of a pair of spring seat members at opposite sides of the frame, means providing a pivotal connection between each seat member and the frame for the support of the frame, upper springs extending above the respective seat members and centrally connected therewith, lower springs extending below the respective seat members and centrally connected therewith, one of said upper springs and one of said lower springs comprising a pair at each side of the frame, annular brackets provided with upper and lower pintles pivotally engaged with the ends of the respective springs and disposed between the ends of the springs constituting each pair, two load bearing axles, each extending through the annular brackets at opposite sides of the frame adjacent the associated ends of the pairs of springs whereby to support the brackets, the springs and the frame, and laterally spaced torque arms each connected with the frame midway between the axles and extending thence in opposite directions and connected with the respective axles, said torque arms being disposed substantially at the level of the upper springs of the respective pairs.

4. In a vehicle, the combination with a pair of load bearing axles each provided with wheels and provided adjacent such wheels with spherically rounded bearing surfaces, of spring anchorage brackets swiveled upon the respective bearing surfaces, frame supporting springs connected in pairs with the brackets of the respective axles at the ends of such springs, means rigidly connecting the central portions of said springs and providing for frame support therefrom, said springs having eyes at their ends and the respective brackets having pins engaged in said eyes and of greater length than said eyes whereby to accommodate relative lateral movement of the pins through the eyes of the springs, said brackets having means laterally engaging the eyes of the respective springs in outward thrust relationship in the normal horizontal positions of respective axles and movable from said springs as said pins are drawn through said eyes in the tilting of the respective axles.

5. In a vehicle, the combination with a frame, of a spring in supporting relation to the frame, means connecting the spring to the frame, an axle in supporting relation to the spring, said spring comprising a succession of leaves of differing length, a maximum number of such leaves being incorporated in the spring adjacent the said connecting means and the number of leaves progressively decreasing toward the axle, a torque arm pintle connected with the frame and substantially centered with reference to the thickness of said spring adjacent said means, a second torque arm pintle connected with the axle and located near a horizontal transverse line through the end of the spring supported by the axle, and a torque arm connected with the respective pintles of the axle and the frame respectively, whereby to guide the axle and the frame in the course of their relative movement on said spring, the torque arm closely corresponding in position and operation to the natural lever equivalent of the spring whereby the spring is not appreciably deformed or impaired as to freedom of movement by the functioning of the torque arm in guiding relative movement between the frame and axle.

6. In a vehicle, the combination with a frame and a pair of axles, of a cross bar extending transversely of the frame between the axles and provided with laterally projecting skeins, spring seat members journaled upon the respective skeins and provided with upper and lower spring seats, springs centered on their respective seats in pairs at each side of the frame, said springs having like form including relatively short upper leaves and successively lower leaves progressively increasing in length and a main leaf provided with eyes at each end, brackets carried adjacent the respective ends of the respective axles provided with pintles with which the eyes of the several springs are engaged, the upper spring of each pair being engaged with an upper pintle on the bracket of each axle and the lower spring of each pair being engaged with the lower pintle on the same bracket of each axle, torque brackets connected with the frame and disposed above said bar and provided with pintles located substantially at a median level midway of the height of the upper springs of the respective pairs, torque arms connected with the respective axles and disposed slightly above the eyes of the main leaves of the upper springs of the respective pairs, and torque links connecting the respective torque pintles with the axles with the torque arm pintles of the frame and extending longitudinally of the upper springs at a level substantially midway between the top and bottom thereof, whereby the respective torque links tend to correspond in their arc of oscillation with the eyes of the upper springs to restrain the respective axles against torque oscillation without substantially impairing their freedom of movement relative to the frame upon the respective springs.

7. In a vehicle, the combination with a pair of axles, of a frame having a cross bar between said axles, spring seat members fulcrumed on the cross bar and an upper and lower spring connected to each of said spring seat members and having end portions projecting forwardly and rearwardly therefrom into operative proximity to the respective axles, spherical bearing elements on each of the axles, spring brackets universally swiveled upon the respective bearing elements, eyes at the ends of the respective springs with the inner ends of which said brackets are laterally engaged during normal level operation of said axles, pintles projecting from the point of engagement of said brackets through said eyes and extending beyond said eyes to provide clearance for the movement of said eyes from said brackets when the axles are tilted, a torque rod pintle connected with each axle and located slightly above a horizontal line through the upper bracket pintles, torque rods connected with the respective pintles and disposed at opposite sides of the frame extending along intermediate levels of the upper springs toward a common transverse line through the centers of the upper spring, and anchorage pintles for the respective torque rods disposed approximately on the aforesaid transverse center line through the upper springs, whereby the respective torque rods maintain the respective axles against torque rotation while permitting substantially free and undistorted movement of the respective axles with regard to the frame.

8. The device of claim 7 in which each of said torque rods comprises means for accommodating the tilting of its respective axle respecting the frame.

9. The device of claim 7 in which each of said torque rods and at least one of its associated pintles have complementary spherical bearing surfaces for accommodating the independent tilting movement of the axle with which such torque rod is connected.

10. In a vehicle, the combination with a frame and an axle, of a spring having a relatively heavy portion provided with means connecting it with the frame and having a free end portion connected pivotally with the axle, and a torque rod having a pivotal connection with the frame substantially centered respecting the relatively heavy portion of the spring and having a pivotal connection with the axle at least approximately centered with reference to the pivotal connection of the end portion of the spring with the axle.

11. In a vehicle, the combination with a frame having lateral skeins and spring seat members pivoted to the skeins, of a pair of axles, of a pair of springs at each side of the vehicle connected with the spring seat members and the axles, each pair comprising an upper and lower spring having relatively heavy central portions secured to said spring seat members and relatively flexible terminal portions respectively connected pivotally to upper and lower portions of the respective axles, and torque rods connected to the respective axles in proximity to a transverse line through the pivotal connections of certain of said springs therewith, and having substantially aligned pivotal anchorage means disposed substantially at the level of the mid points of the same springs.

12. The combination with one end portion of a vehicle frame provided with depending brackets, of a transverse support carried by said brackets, upper and lower spring seat mountings pivoted to said support at opposite sides of the frame, upper and lower leaf springs centrally clamped to the respective mountings and provided with pivot eyes at each end, front and rear load bearing axles provided with spherically rounded bearing surfaces, spring supporting brackets mounted to oscillate on said bearing surfaces and pivotally connected with the spring eyes, and torque rods each having universally jointed connection with one of the axles and pivotal connection with a frame part above said support, whereby the axle ends may each move in a vertical plane without imposing cramping strains on the spring supporting brackets, springs, and torque rod connections.

13. In a vehicle rear bogie assembly, the combination with a front load bearing axle having a differential gear casing at one side of the vehicle center line, and a rear load bearing axle having a differential gear casing at the opposite side of the vehicle center line, an obliquely disposed pillow block mounted on the central portion of the front load bearing axle, a transmission shaft having a rear section extending into the front differential gear casing, and another transmission shaft having one section journaled in the pillow block and a rear section extending into the rear differential gear casing, a frame supporting transversely extending member between said load bearing axles and provided with pivotal spring mountings on its end portions, upper and lower leaf springs at each side of the frame having their central portions clamped to said mountings above and below said transverse frame supporting member, and their ends pivoted to hanger brackets, said hanger brackets each having universally jointed connection with one of said load bearing axles, and torque rods on opposite sides of said center line, each having universally jointed connection with one of said differential gear casings and pivotal connections with the vehicle frame above said transverse support and between the upper portions of the spring mountings.

14. In a vehicle rear bogie assembly, the combination with a front load bearing axle having a differential gear casing at one side of the vehicle center line, and a rear load bearing axle having a differential gear casing at the opposite side of the vehicle center line, an obliquely disposed pillow block mounted on the central portion of the front load bearing axle, a transmission shaft having a rear section extending into the front differential gear casing, another transmission shaft having one section journaled in the pillow block and a rear section extending into the rear differential gear casing, a frame supporting transversely extending member between said load bearing axles and provided with pivotal spring mountings on its end portions, upper and lower leaf springs at each side of the frame having their central portions clamped to said mountings above and below said transverse frame supporting member, and their ends pivoted to hanger brackets, said hanger brackets each having universally jointed connection with one of said load bearing axles, and torque rods on opposite sides of said center line, each having universally jointed connection with one of said differential gear casings and pivotal connection with the vehicle frame above said transverse support and between the upper portions of the spring mountings, said torque rods having a downward inclination from their connection with the vehicle frame to a horizontal plane adjacent the spring hanger pivots.

15. The combination with one end portion of a vehicle frame, of a transverse frame member having end portions provided with oscillatory spring mountings, multi-leaved springs clamped to the mountings above and below their centers of oscillation, front and rear load bearing axles provided with spherically rounded bearing surfaces near their respective ends, a spring hanger bracket mounted for universal oscillation on each of said bearing surfaces with the main leaf of each spring pivotally connected at each end with one of said brackets, torque rods each pivotally connected with the main frame on a transverse line substantially in the vertical plane of the center line of said transverse member, and universal joint connections between the other ends of the torque rods and the front and rear load bearing axles respectively.

16. The combination with one end portion of a vehicle frame, of a transverse frame member having end portions provided with oscillatory spring mountings, multi-leaved springs clamped to the mountings above and below their centers of oscillation, front and rear load bearing axles provided with spherically rounded bearing surfaces near their respective ends, a spring hanger bracket mounted for universal oscillation on each of said bearing surfaces with the main leaf of each spring pivotally connected at each end with one of said brackets, torque rods each pivotally connected with the main frame on a transverse line substantially in the vertical plane of the center line of said transverse member, and universal joint connections between the other ends of the torque rods and the front and rear load bearing axles respectively, said torque rod connections with the main frame being normally substantially in line with the centers of the upper leaf spring sets and their connections with the axles being normally proximal to the plane of the pivotal connections of the main leaves of said upper sets with their associated hanger brackets.

17. The combination with one end portion of a vehicle frame and a transverse support carried thereby, of spring seat mountings pivoted to the respective ends of said support, leaf springs centrally clamped to the respective mountings and provided with pivot eyes at each end, front and rear load bearing axles provided with spherically rounded bearing surfaces, spring supporting brackets mounted to oscillate on said bearing surfaces and pivotally connected with the spring eyes, torque rods having substantially aligned pivotal connections with a frame part above said support, and universally jointed connections between the other ends of the torque rods and the load bearing axles adjacent to the horizontal plane of the pivot eyes of said springs.

18. The combination with one end portion of a vehicle frame and a bogie assembly including a set of supporting power driven wheels and a pair of tubular load bearing axles having differential gear housings and transmission shaft connections leading to the respective housings, of a transverse support carried by said frame and having spring seat mountings pivoted to the respective ends of the support, leaf springs centrally clamped to the respective mountings and provided with pivot eyes at each end, spring supporting brackets mounted for universal oscillation on said axles and to which the spring eyes are pivotally connected, and torque rods pivotally connected with the frame by axially aligned pivot pins in a vertical plane substantially midway of the axles, said torque rods each having at its other end universally oscillatory connection with one of the axles.

GEORGE D. SIMONDS.